United States Patent
Singh (10) Patent No.: US 10,057,429 B2
(45) Date of Patent: Aug. 21, 2018

(54) PRE-PAID VOICE CALLING USING SPONSORED DATA ROAMING

(71) Applicant: iBasis, Inc., Lexington, MA (US)

(72) Inventor: Manpreet Singh, Ellington, CT (US)

(73) Assignee: iBasis, Inc., Lexington, MA (US)

( * ) Notice: Subject to any disclaimer, the term of this patent is extended or adjusted under 35 U.S.C. 154(b) by 0 days.

(21) Appl. No.: 15/341,200

(22) Filed: Nov. 2, 2016

(65) Prior Publication Data

US 2018/0124252 A1    May 3, 2018

(51) Int. Cl.
*H04W 4/24* (2018.01)
*H04M 15/00* (2006.01)

(52) U.S. Cl.
CPC .......... *H04M 15/39* (2013.01); *H04M 15/56* (2013.01); *H04M 15/60* (2013.01); *H04M 15/8038* (2013.01); *H04W 4/24* (2013.01)

(58) Field of Classification Search
CPC ...... H04M 15/39; H04M 15/60; H04M 15/56; H04M 15/8038; H04W 4/24
See application file for complete search history.

(56) References Cited

U.S. PATENT DOCUMENTS

| | | | |
|---|---|---|---|
| 6,018,652 | A | 1/2000 | Frager et al. |
| 6,029,062 | A | 2/2000 | Hanson |
| 6,516,190 | B1 | 2/2003 | Linkola |
| 6,804,505 | B1 | 10/2004 | Nilsson et al. |
| 7,599,887 | B1 | 10/2009 | Short |
| 8,090,344 | B2 | 1/2012 | Hamadi et al. |
| 8,374,602 | B2 | 2/2013 | Jiang |

(Continued)

FOREIGN PATENT DOCUMENTS

| | | |
|---|---|---|
| CN | 102480718 B | 4/2015 |
| WO | WO 2014/183796 A1 | 11/2014 |

OTHER PUBLICATIONS

Chang; "The Future of Roaming Services;" Synergy: The Syniverse Blogazine; http://synergy.syniverse.com/2014/12/future-roaming-services/; Dec. 5, 2014; 7 pages.

(Continued)

*Primary Examiner* — Chuong A Ngo
(74) *Attorney, Agent, or Firm* — Hamilton, Brook, Smith & Reynolds, P.C.

(57) ABSTRACT

A method or corresponding apparatus for placing outgoing voice calls using data while roaming. At least one example embodiment may include a mobile device communicating with a calling service through a first data connection path. According to an aspect of the example embodiment, the first data connection path may include a first visited mobile network communicatively coupled to a home mobile network communicatively coupled to the calling service. According to another aspect of the example embodiment, the mobile device may be configured to connect to the first data connection path through the visited mobile network; send connection information (e.g., destination number, the home mobile network, the first visited network, and a first access type, etc.) to the calling service; and place a call with a first calling rate through the first data connection path using the calling service, wherein the first calling rate is based on the connection information.

39 Claims, 5 Drawing Sheets

(56) References Cited

U.S. PATENT DOCUMENTS

| | | |
|---|---|---|
| 8,606,704 B2 | 12/2013 | Roberts |
| 8,693,358 B2 | 4/2014 | Hodges |
| 8,825,003 B2 | 9/2014 | Ravishankar et al. |
| 9,014,663 B2 | 4/2015 | Saker et al. |
| 2002/0176377 A1 | 11/2002 | Hamilton |
| 2003/0083041 A1 | 5/2003 | Kumar et al. |
| 2005/0213721 A1 | 9/2005 | Hakala et al. |
| 2009/0264097 A1 | 10/2009 | Cai et al. |
| 2010/0203863 A1 | 8/2010 | Kapelushnik et al. |
| 2011/0086628 A1* | 4/2011 | Karuturi, Sr. ........ H04Q 3/0029 455/418 |
| 2011/0294534 A1* | 12/2011 | Gunder ................. H04W 60/00 455/524 |
| 2012/0155380 A1 | 6/2012 | Hodges |
| 2012/0250586 A1 | 10/2012 | Ahmavaara et al. |
| 2013/0316703 A1 | 11/2013 | Girard et al. |
| 2014/0036785 A1 | 2/2014 | Li et al. |
| 2014/0273938 A1* | 9/2014 | Sym .................... H04L 12/1407 455/406 |
| 2015/0025976 A1 | 1/2015 | Guo et al. |
| 2015/0044989 A1 | 2/2015 | De Foy et al. |
| 2015/0109967 A1 | 4/2015 | Hogan et al. |
| 2015/0242903 A1 | 8/2015 | Peebles et al. |

OTHER PUBLICATIONS

Forge; "Towards an ITU cost model for international mobile roaming for NRAs;" ITU-T Study Group 3: Mini-Workshop; Geneva, Switzerland; May 26, 2014; 46 pages.

Kaufman; "Ovum's innovative service of the month: AT&T's sponsored data;" Ovum, Mar. 19, 2014; 3 pages.

Sandvine: Intelligent Broadband Networks; "Technology Showcase: Sponsored Data Connectivity;" PDF Created on Mar. 10, 2015; 8 pages.

Sen et al.; "A Survey of Smart Data Pricing: Past Proposals, Current Plans, and Future Trends;" ACM Computing Surveys, vol. 146, No. 2, Jun. 2014; 34 pages.

Tech Central; "Cell C to zero-rate WhatsApp calls;" http://www.techcentral.co.za/cell-c-to-zero-rate-whatsapp-calls/62681/; Jan. 22, 2016; 3 pages.

Extended European Search Report for European Application No. 17199500.4, dated Jan. 24, 2018.

* cited by examiner

FIG. 4 though a virtual private network (VPN) or through a public internet connection. In some embodiments, the home mobile network may be configured to utilize an access point name (APN) gateway to route the data from the mobile device directly to the calling service.

PRE-PAID VOICE CALLING USING SPONSORED DATA ROAMING

BACKGROUND

Service providers in general and mobile network operators (MNOs) in particular provide a range of communications' services to corresponding subscribers. Such services include, for example, voice, voice over Internet Protocol (IP), voice over long term evolution (LTE), streaming, broadcasting, multicasting, or other services. In providing such services, service providers typically implement different functionalities, e.g., billing functionalities, quality of service (QoS) functionalities, etc., to manage the offered services and the corresponding usage by subscribers.

In order to expand geographical coverage of offered services beyond the network coverage of each service provider, service providers typically engage in interworking and roaming arrangements. When a mobile subscriber is roaming on a visited mobile network and places an outgoing voice call, the voice call is typically handled by the visited mobile network using a voice termination service or network. The mobile subscriber is usually billed at a per minute rate (e.g., $1 per minute) for roaming calls and the billing rate is usually fixed, predetermined by the home network operator, and specific to the region or country the visited mobile network is located. In many cases the calling rate for placing outgoing calls while roaming is very expensive, and is frequently the cause of "bill shock" when mobile subscribers receive their monthly mobile phone bill.

SUMMARY

Embodiments of the present disclosure provide the technical architecture and corresponding method to enable mobile subscribers to place outgoing calls using a packetized data connection (as opposed to the traditional circuit switch connection) while roaming on a visited mobile network. This approach enables the mobile subscribers to avoid the expensive (and often unknown) traditional voice calling rate set by the home mobile network. According to some embodiments of the present disclosure, the mobile subscriber may have a prepaid balance which is debited from as the mobile subscriber places roaming calls. This prevents the mobile subscriber from experiencing "bill shock" as there will be no unexpectedly high mobile phone bill from their home network. In some embodiments, after the mobile subscriber enters a destination number into their UE, the UE calculates and displays the per minute rate for that call. The mobile subscriber can view the rate and decide whether or not to place the call with confidence.

According to at least one example embodiment, the present disclosure may be implemented in the form of a method or corresponding apparatus for placing outgoing voice calls using data while roaming. The at least one example embodiment may include a mobile device (e.g., UE) communicating with a calling service through a first data connection path. According to an aspect of the example embodiment, the first data connection path may include a first visited mobile network communicatively coupled to a home mobile network communicatively coupled to the calling service. According to another aspect of the example embodiment, the mobile device may be configured to connect to the first data connection path through the visited mobile network; send connection information (e.g., destination number, the home mobile network, the first visited network, and a first access type, etc.) to the calling service; and place a call with a first calling rate through the first data connection path using the calling service, wherein the first calling rate is based on the connection information.

According to some embodiments, the home mobile network may be configured to recognize the mobile device communicating with the calling service through the first data connection path, record an amount of data communicated between the mobile device and the calling service, and charge the calling service for the amount of data communicated between the mobile device and the calling service. In some embodiments, the mobile subscriber who owns the mobile device is not charged for the data by the home mobile network (i.e., the data is zero-rated or sponsored by the calling service). In this case the mobile subscriber is only charged the first calling rate by the calling service, or the mobile subscriber's prepaid balance is deducted by the first calling rate.

According to some embodiments, the mobile device may be further configured to detect a second data connection path to the calling service, disconnect from the first data connection path, connect to the second connection path, send updated connection information to the calling service indicating a second visited network or a second access type, and continue the placed call with a second calling rate through the second data connection path using the calling service, wherein the second calling rate is based on the updated connection information.

According to at least one other example embodiment, the mobile device may be further configured to detect a second data connection path to the calling service and identify updated connection information indicating a second visited network or a second access type, send the updated connection information to the calling service, determine or receive a second calling rate based on the updated connection information, and continue the placed call with the second calling rate through the second data connection path using the calling service.

According to some embodiments, the home mobile network may be communicatively coupled to the calling service through a virtual private network (VPN) or through a public internet connection. In some embodiments, the home mobile network may be configured to utilize an access point name (APN) gateway to route the data from the mobile device directly to the calling service.

According to some embodiments, the mobile device may be further configured to optimize the placed call by utilizing an audio codec to reduce data communicated between the mobile device and the calling service. In some embodiments, the calling service may be configured to optimize the placed call by utilizing an audio codec to reduce data communicated between the mobile device and the calling service.

According to some embodiments, the communication information may further include a destination number and/or an originating number.

In some embodiments, the first access type may be a 5G ($5^{th}$ generation mobile network connection), a Long-Term Evolution connection, a 3G connection, or a wireless local area network connection.

According to at least one other embodiment, a calling service communicatively coupled to a mobile device through a first data connection may be configured to receive connection information from the mobile device indicating a home mobile network, a first visited mobile network, and a first access type. According to another aspect, the calling service may be further configured to determine a first call rate based on the connection information, place a call for the mobile device subject to the determined first call rate, and communicate the placed call to the mobile device through the first data connection. In some embodiments, the mobile device may be roaming on the visited mobile network.

According to an aspect of the at least one other embodiment, the calling service may be charged for an amount of data communicated between the mobile device and the calling service over the first data connection.

According to another aspect of the at least one other embodiment, the calling service may be configured to receive updated connection information from the mobile device, the updated connection information indicating a second visited network or a second access type. The calling service may also be configured to determine a second call rate based on the updated connection information, change the determined first call rate to the determined second call rate, and continue to communicate the placed call to the mobile device.

According to at least one other embodiment, a mobile device may communicate with a calling service through a first data connection path, and the mobile device may be configured to connect to the first data connection path, and send connection information to the calling service, the connection information indicating a home mobile network, a first visited network, and a first access type. In some embodiments, the mobile device may be further configured to place a call with a first calling rate through the first data connection path using the calling service, wherein the first calling rate is based on the connection information.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figure 1:
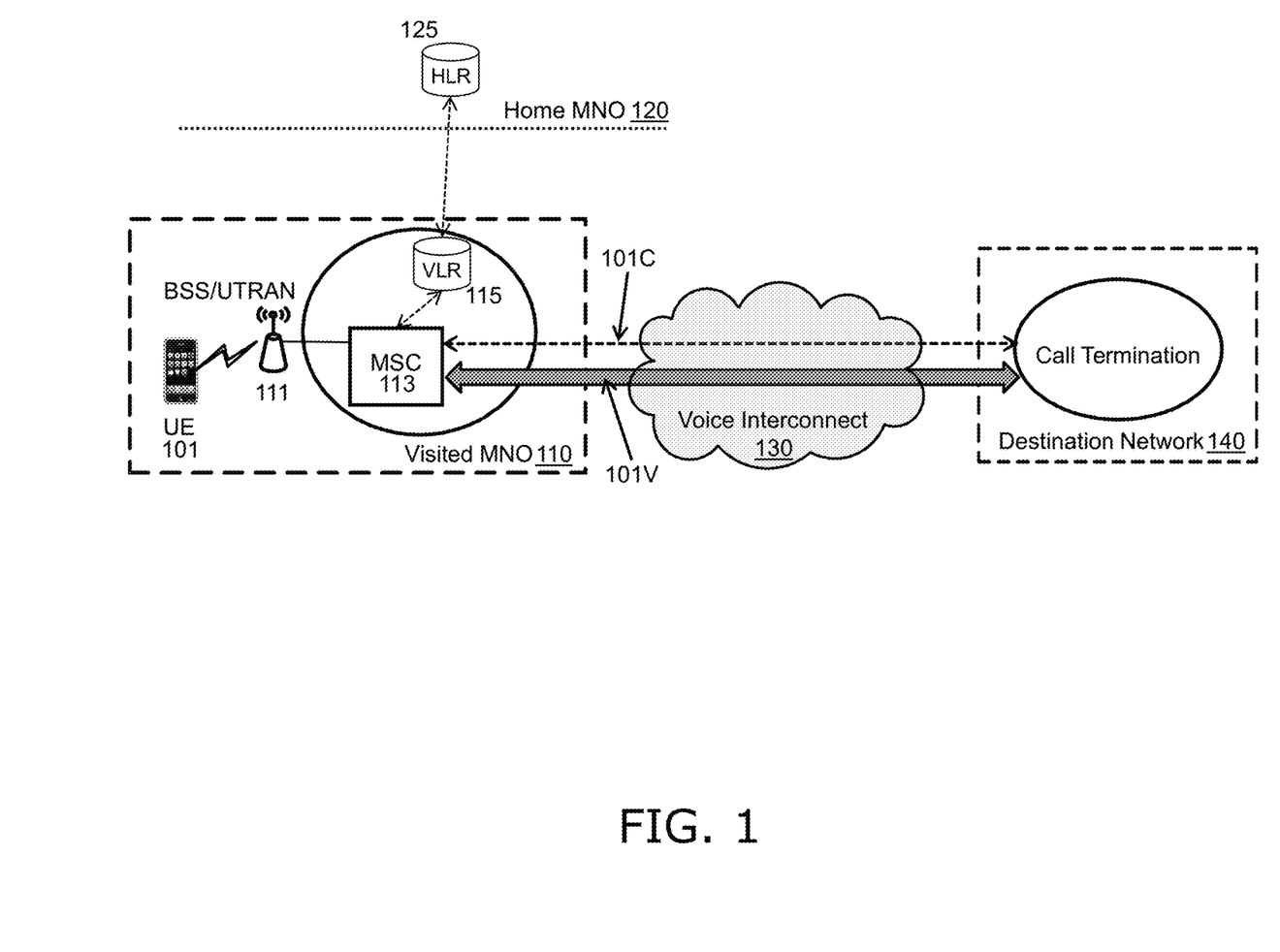
FIG. 1 is a high level diagram illustrating a communications system for placing an outgoing call through a voice interconnect network.

According to the example diagram in FIG. 1, a mobile subscriber with user equipment (UE) 101 roaming on a visited mobile network 110 enters a telephone number (destination number) into the UE 101. The UE 101 sends a call setup request to the visited mobile network 110 through the BSS/UTRAN 111. The visited mobile network's mobile switching center (MSC) 113 communicates the voice 101V and control 101C signaling through a voice interconnection network (e.g., Public Switched Telephone Network (PSTN), Public Land Mobile Network (PLMN), Packet Data Networks (PDN), Integrated Services Digital Network (ISDN), or any other voice termination network). Typically, the visited mobile network 110 creates an entry in its visitor location register (VLR) 115 for the roaming UE 101. The VLR 115 stores information about the mobile devices (e.g., UE 101) that are active in the geographical area assigned to the VLR 115. When the UE 101 roams into that geographical area, the VLR 115 copies the subscriber information for UE 101 from the HLR 125 of the home mobile network 120. The visited mobile network 110 uses the subscriber information to authenticate the UE 101 and to produce a call detail record (CDR) used to bill the home mobile network 120 for terminating the call originating from UE 101.

The home network 120 receives the CDR and a bill from the visited mobile network 110 for terminating the UE 101's roaming voice call. The home network 120 also uses the CDR to bill the mobile subscriber that owns the UE 101. The mobile subscriber is usually billed at a per minute rate (e.g., $1 per minute) for originating roaming voice calls. The billing rate is usually fixed, predetermined by the home network, and is specific to the region or country the visited mobile network is located. In many cases the calling rate for placing outgoing calls while roaming is very expensive, and is frequently the cause of "bill shock" when mobile subscribers receive their monthly mobile phone bill. Not only is the calling rate for placing outgoing calls while roaming expensive, but often times mobile subscribers are unfamiliar with the roaming call rate they will be charged. This leads mobile subscribers to avoid placing calls while roaming, which in effect reduces mobile networks' revenue, and inconveniences the mobile subscribers.

Figure 2A:
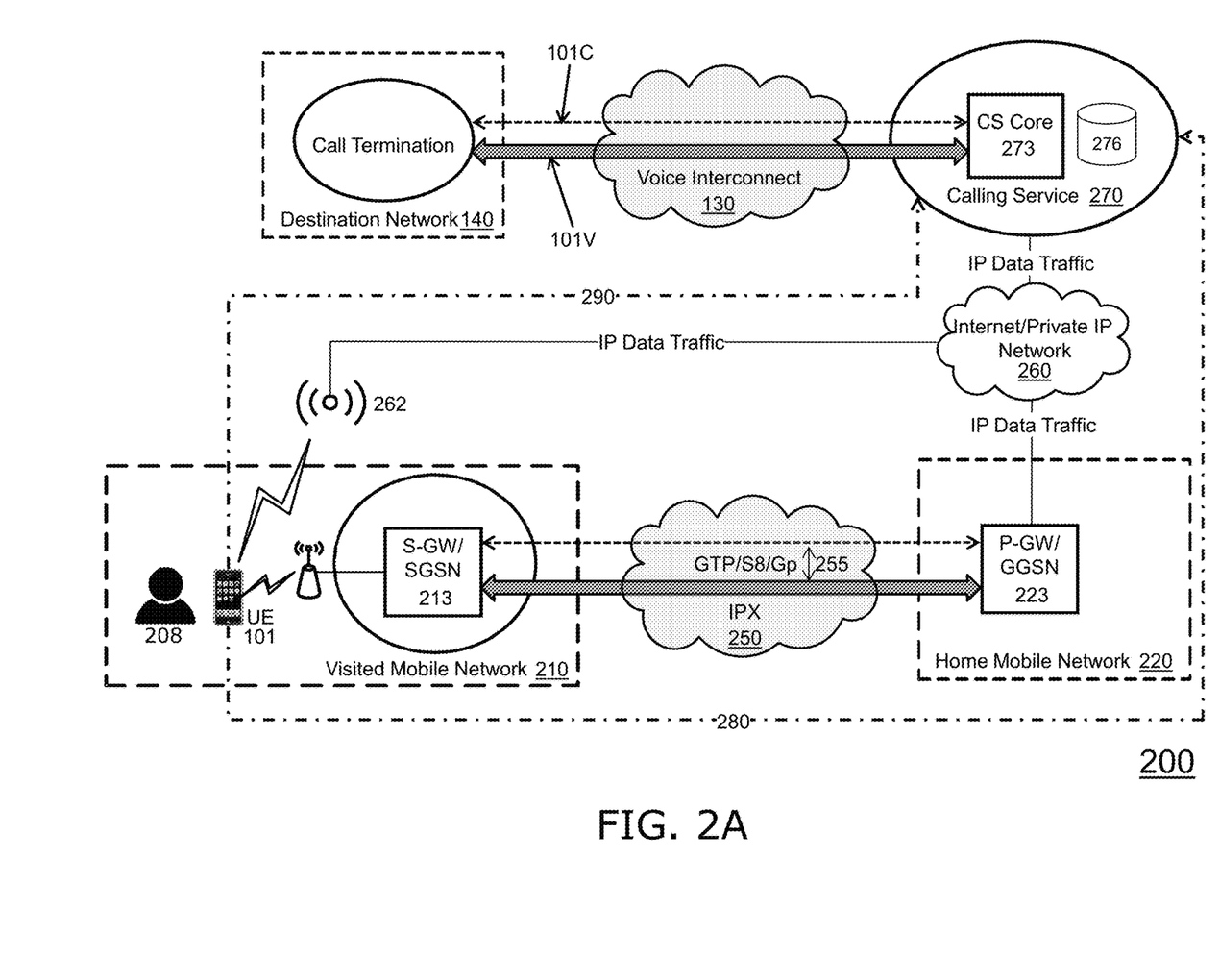
FIG. 2A is a high level diagram illustrating a communications system for placing an outgoing call with a mobile device using a data connection.

FIG. 2A is a block diagram of a communications system employing an example embodiment of the present disclosure. According to the example embodiment illustrated in FIG. 2A, a mobile device (UE 101), roaming on a visited mobile network 210, is enabled to place an outgoing call with a calling service through a first data connection path 280. According to this example embodiment, the first data connection path 280 includes a visited mobile network 210, an IPX/Inter-service provider network 250, the home mobile network 220 of the UE 101, and an external connection network 260 to the calling service 270.

In some embodiments, the first data connection path 280 includes an IP packet eXchange (IPX) system 250 as an intermediate between the visited 210 and home 220 mobile networks. According to the example architecture depicted in FIG. 2A, the first data connection path 280 supports roaming services, and other services, to the UE 101 associated with both third generation (3G) networks and long term evolution (LTE) networks. For example, in LTE roaming, the IPX system 250 provides IP transport between a serving gateway (S-GW) 213 in the visited mobile network 210 and a packet data network (PDN) gateway (P-GW) 223 in the home mobile network 220. Alternatively, in 3G roaming, the IPX system 250 provides IP transport between a serving GPRS support node (SGSN) 213 of the visited mobile network 210 and a gateway GPRS support node (GGSN) 223 in the home 3G network 220.

In some embodiments, data may be transferred between the UE 101 and an external IP network 260 (e.g., the Internet, a private IP network, VPN, etc.). The data may be transferred from the UE 101 across the S8/Gp interface 255, which includes control-plane data and user-plane data. According to some embodiments, a control channel and a user data channel are established between the two network elements, e.g., S-GW 132 and P-GW 118 (LTE) or SGSN 143 and GGSN 127 (3G), in response to a network access request from the UE 101. According to embodiments of the present disclosure, the network access request may be the UE 101 requesting access to the calling service 270 to establish a data connection path 280 between the UE 101 and the calling service 270.

In some embodiments, control-plane data may be exchanged through the control channel between the S-GW/SGSN 213 and the P-GW/GGSN 223, to setup/delete a packet data protocol (PDP) context for the UE 101. In particular, resources and tunnel identification associated with a user data session are negotiated, based on a user's (mobile subscriber 208) identification and policy, at the control-plane in response, for example, to a network access request. The negotiated parameters are then used to establish, and/or maintain, a user data channel, or tunnel (e.g., GTP tunnel 255). User data is typically transferred between the visited mobile network 210 and the home mobile network 220, through the user data channel (GTP tunnel 255) established. Data packets (i.e., data requests) sent across the GTP tunnel 255, are de-multiplexed at the P-GW/GGSN 223, and then forwarded, for example, to the external packet network 260 (e.g., the Internet, a Private IP Network, VPN, etc.). Also, data packets received from the calling service 270 through the external packet network 260, are multiplexed by the P-GW/GGSN 223, and sent through the GTP tunnel 255 to UE 101.

According to some embodiments, once the first data connection path 280 between the UE 101 and the calling service 270 is established the user/mobile subscriber 208 may request to place a call to a destination telephone number using the UE 101. Alternatively, in other embodiments, the first data connection path may be established after the user/mobile subscriber 208 enters the destination number on the UE 101.

In some embodiments, the UE 101 collects (or detects) and transmits connection information through the first data connection path 280 to the calling service 270. In some embodiments, the UE 101 is executing an application that collects the connection information available to the UE 101 and/or detects connection information (e.g., detects the location of the UE 101 using a built GPS sensor). According to some embodiments, the UE 101 may transmit the connection information to the calling service 270 at any time. For example, the UE 101 may collect and transmit the connection information upon the UE 101 opening the application that collects the connection information. Alternatively, the UE 101 may transmit the connection information after the mobile subscriber 208 enters the destination number, or after the mobile subscriber 208 places the call to the destination number.

According to some embodiments, the UE 101 may, after the mobile subscriber 208 enters the destination number, but before the call is placed, transmit the connection information and the destination number to the calling service 270 and receive, from the calling service 270, a calling rate for the placing the call to the destination number. In this embodiment, the UE 101 may display the received calling rate to the mobile subscriber 208, allowing the mobile subscriber 208 to decide whether or not to place the call for the determined calling rate. Alternatively, the UE 101 (and/or an application running on the UE 101) may determine the calling rate based on the connection information and destination number instead of the calling service 270.

According to some embodiments, the connection information may include any combination of the following information, the destination number, the originating number (i.e., the phone number assigned to the UE 101), the home mobile network operator, the visited mobile network operator, an access type, and the location of the UE 101 and/or the visited mobile network 210. The access type refers to the type of data connection the UE 101 is utilizing to communicate with the calling service. For example, the access type may be an LTE or 3G connection through the first data connection path 280, an Internet connection through a local area network connection (LAN) (or wireless local area network connection (WLAN)), or any other type of data connection. In some embodiments, the calling service 270 may store a pre-negotiated data rate associated with the home mobile network operator, or with the combination of the home mobile network operator and the visited mobile network operator.

According to some embodiments, the calling service 270 receives the transmitted connection information and utilizes the connection information to determine a calling rate the calling service 270 will charge the mobile subscriber 208 for placing the call. The present disclosure provides the technological support necessary for the calling service 270 to utilize a novel method of determining a calling rate and charging the mobile subscriber 208 the determined calling rate. Typically, as described above in reference to roaming mobile calls placed using the architecture illustrated in FIG. 1, the mobile subscriber is charged a predetermined calling rate (e.g., $1 per minute) by the home mobile network. Embodiments of the present disclosure enable to the mobile subscriber 208 to circumvent that calling rate in favor of placing an outgoing call using the calling service 270.

In some embodiments, the calling service 270 determines the calling rate based upon several factors that may include a combination of the connection information and predetermined data expenses (i.e., pre-negotiated data rates) stored on a database 276 at the calling service 270. One of ordinary skill in the art recognizes there are numerous ways for the calling service 270 to determine the calling rate. The following examples are non-limiting illustrative examples of how the calling rate may be determined.

Figure 3:
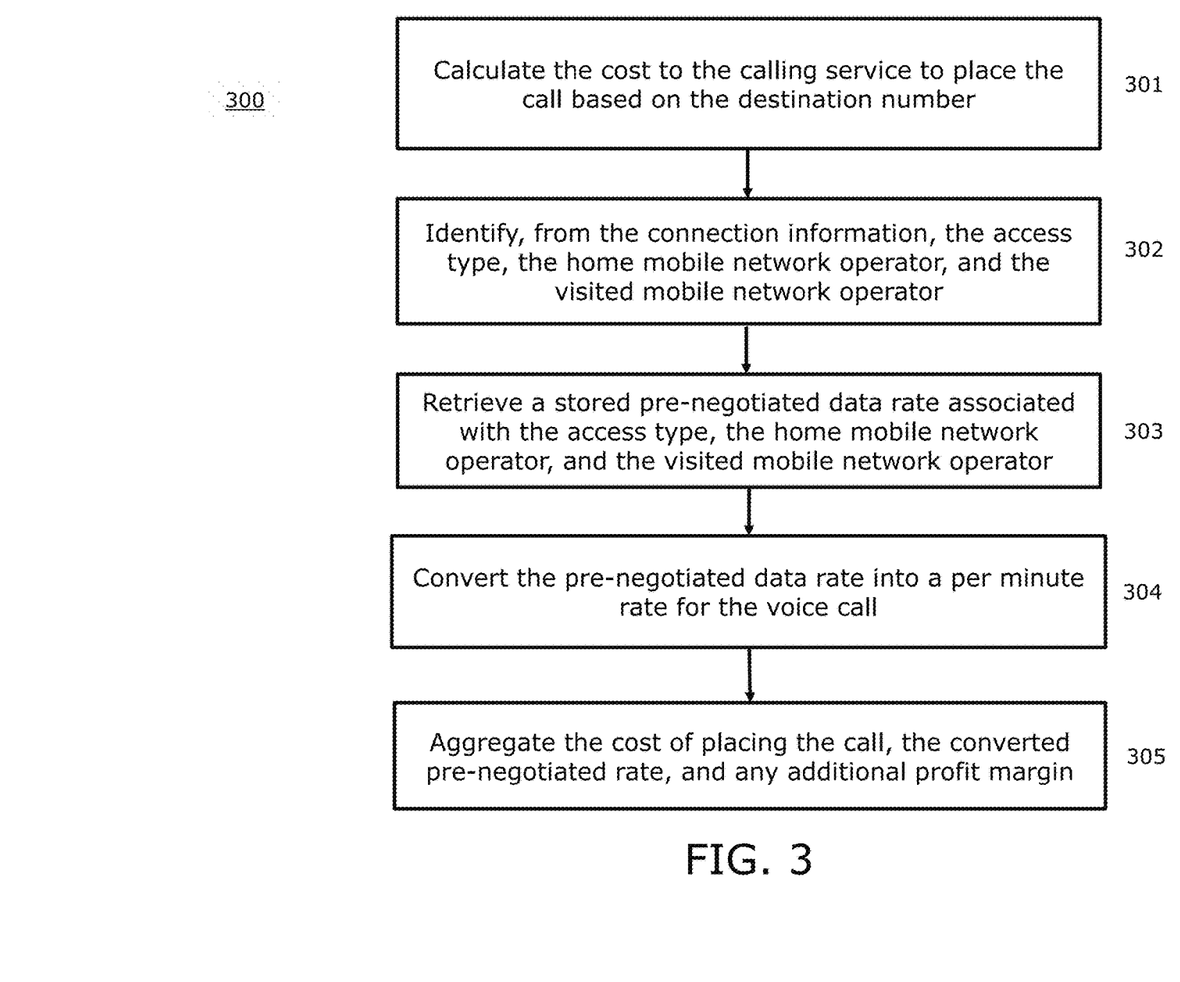
FIG. 3 is a flow chart illustrating an example method for determining a calling rate based on connection information.

In some embodiments, the calling service 270 may determine the calling rate using the example method 300 shown in FIG. 3. According to the example method 300, the calling service may calculate 301 the cost (i.e., the per minute call rate) to the calling service 270 to place the call based on the destination number entered on the UE 101 by the mobile subscriber 208. For instance, placing/terminating long distance calls (in relation to the calling service 270) is more costly than placing local calls. Thus, the calling service 270 takes into account its cost to place the call to the destination number.

According to some embodiments, the calling service 270 may identify 302, from the connection information, the access type, the mobile subscriber's home mobile network operator, and the visited mobile network operator. According to some embodiments, the calling service 270 may have a pre-negotiated data rate with the home mobile network operator for roaming mobile subscribers utilizing the first data connection 280 to connect with the calling service 270. In some embodiments, the pre-negotiated data rate may be stored on the database 276. The pre-negotiated data rate may be particular to the access type and/or to the visited mobile network operator. For instance, the pre-negotiated data rate may depend on whether the UE 101 is using an LTE, 3G, or WiFi data connection. In some embodiments, if the UE 101 device is connected to a WiFi or other Internet connection not facilitated through the visited or home mobile networks.

In this case the calling service 270 would not include any pre-negotiated data rate in the determination of the calling rate.

Typically, as described above, when a mobile subscriber is roaming on a visited mobile network and places a call to a destination number the mobile subscriber is charged a predetermined rate by the home mobile network operator. For example, the mobile subscriber may be charged $1 or more per minute for the call. In a similar billing arrangement, the mobile subscriber is typically charged a predetermined rate per megabyte (or per kilobyte) by the home mobile network operator for data used while roaming. For example, the mobile subscriber may be charged $2 or more per megabyte for roaming data depending on their agreement with the mobile operator. In both cases, the visited mobile network operator typically has a separate billing arrangement with the home mobile network operator for any voice calls or data usage by the home mobile network operator's mobile subscribers.

Embodiments of the present disclosure allow the calling service 270 to negotiate a data rate with the home mobile network operator for data used by the mobile subscribers of a home mobile network while accessing the calling service 270 from their mobile devices (e.g., UE 101). This pre-negotiated rate may be considerably lower than the typical predetermined data rate between the mobile subscriber and the home mobile network operator, because the calling service has more leverage and/or may pre-purchase large amounts of data at wholesale rates.

According to some embodiments, the home mobile network 220 may be configured to recognize that the UE 101 is communicating with the calling service through the first data connection path 280. In some embodiments, the home mobile network 220 may track and record the data transmitted through the first data connection path 280, between the UE 101 and the calling service 270. In some embodiments, the home mobile network may keep track or record data transmitted through the first data connection 280 separately from data the mobile subscribers utilize with other data services. This allows the home mobile network 220 to bill the calling service 270 for the data transmitted over the first data connection path 280, instead of the mobile subscriber 208. In other words, the data transmitted over the first data connection path 280 is zero-rated or sponsored by the calling service 270 in relation to other data the mobile subscriber 208 uses while roaming. Meaning that the mobile subscriber 208 is not charged by the home mobile network or the visited mobile network 210 for that specific data connection 280 to the calling service 270. Instead, the calling service 270 is charged the pre-negotiated data rate by the home mobile network 220 for the data used to place and complete the call.

Referring back to FIG. 3, according to some embodiments, the calling service 270 may retrieve 303, from a database 276, a stored pre-negotiated data rate associated with the access type, the home mobile network operator, and the visited mobile network operator. The pre-negotiated data rate is the rate the home mobile network operator is going to charge the calling service 270 for providing (or facilitating) the first data connection 280.

In some embodiments, the calling 270 service converts 304 the pre-negotiated data rate into a per minute rate for the voice call. The calling service may determine the conversion by estimating the amount of data per minute necessary to transmit the voice traffic through the data connection path 280 during the call. Typically, the voice data required may be between 1-1.4 megabytes per minute depending on the call quality and compression methods used. For example, if the pre-negotiated data rate is $0.15 per megabyte and the voice data requires 1 megabyte per minute, the converted calling rate is $0.15 per minute. In some embodiments, the converted calling rate may be predetermined and stored in the database 276.

According to some embodiments, the calling service 270 may aggregate 305 the cost of placing the call from the calling service to the destination number, and the converted pre-negotiated rate, and (optionally) any additional profit margin, resulting in the determined calling (per minute) rate for the mobile subscriber 208 to place the call. In some embodiments, the calling service 270 may transmit the calling rate back to the UE 101, where it may be displayed to the mobile subscriber 208. In other embodiments, the UE 101 may determine the calling rate based on the connection information, and the predetermined information.

According to some embodiments, the calling service 270 may apply a discount to the determined calling rate for the mobile subscriber 208 to place the call. One of ordinary skill in the art recognizes there are numerous ways for the calling service 270 to apply a discount to the determined calling rate. The following examples are non-limiting illustrative examples of how and why the calling rate may be discounted.

In some embodiments, the calling service 270 may apply a discount to the determined calling rate if the mobile subscriber views one or more advertisements before, during, or after placing the call. The amount the calling rate is discounted may depend on the amount of advertisement revenue generated by the mobile subscriber 208 viewing the one or more advertisements. In other embodiments, the discount may be applied based on the time or day of the week the call is placed (e.g., $0.10 per/minute off calls placed after 9:00 pm). In other embodiments, the calling service 270 may apply a discount as a promotional offer to encourage more mobile subscribers to utilize the calling service 270.

According to some embodiments, the discount may be in the form of a flat amount off the placed call (e.g., a $1.00 discount off the entire price of the call). Alternatively, the discount may be in the form of a lowered per minute call rate (e.g., $0.05 per/minute off the per minute call rate). Additionally, the calling service 270 may apply the discount before, during, or after determining the calling rate.

According to some embodiments, the calling service 270 may store a prepaid balance for the mobile subscriber in the database 276 and subtract from the prepaid balance, by the determined calling rate, during the duration of the call to the destination number. In other embodiments, the calling service 270 may charge the mobile subscriber after the call is completed.

Referring back to FIG. 2A, according to some embodiments, after the calling service 270 or the UE 101 determines the calling rate, the calling service 270 places the call to the destination network 140. In some embodiments, the calling service 270 receives the audio data from the home mobile network 220 over the Internet/Private IP Network 260. In some embodiments, the home mobile network may be configured to utilize an access point name (APN) gateway to route the audio data from the UE 101 directly to the calling service 270. An APN is a gateway between a GSM, GPRS, 3G or 4G mobile network (e.g., the home mobile network 220) and a to a packet data network (PDN) (e.g., the calling service 270). In some embodiments, the APN gateway at the home mobile network may identify that the UE 101 is requesting to communicate with the calling service 270, and define the type of service that is provided by the calling service 270.

According to some embodiments, the calling service 270 may include circuit switched core 273 that converts the IP traffic (audio data from the call) from the Internet/Private IP Network 260 to circuit switched traffic using traditional digital ISDN/PSTN protocols that transmit voice traffic using non-IP systems. The calling service 270 may transmit the circuit switched traffic over the voice interconnect 130 to the destination network 140 where the call is terminated. In some embodiments, the switched core 273 communicates the voice 101V and control 101C signaling through a voice interconnection network (e.g., Public Switched Telephone Network (PSTN), Public Land Mobile Network (PLMN), Packet Data Networks (PDN), Integrated Services Digital Network (ISDN), or any other voice termination network) to the destination network 140.

According to other embodiments, the destination network 140 may be configured to receive calls as packetized IP traffic from the calling service 270. In this embodiment, the calling service 270 may send the audio data from the call as packetized IP traffic to the destination network 140 without converting it into ISDN/PSTN protocols or using a traditional circuit switched architecture.

Figure 2B:
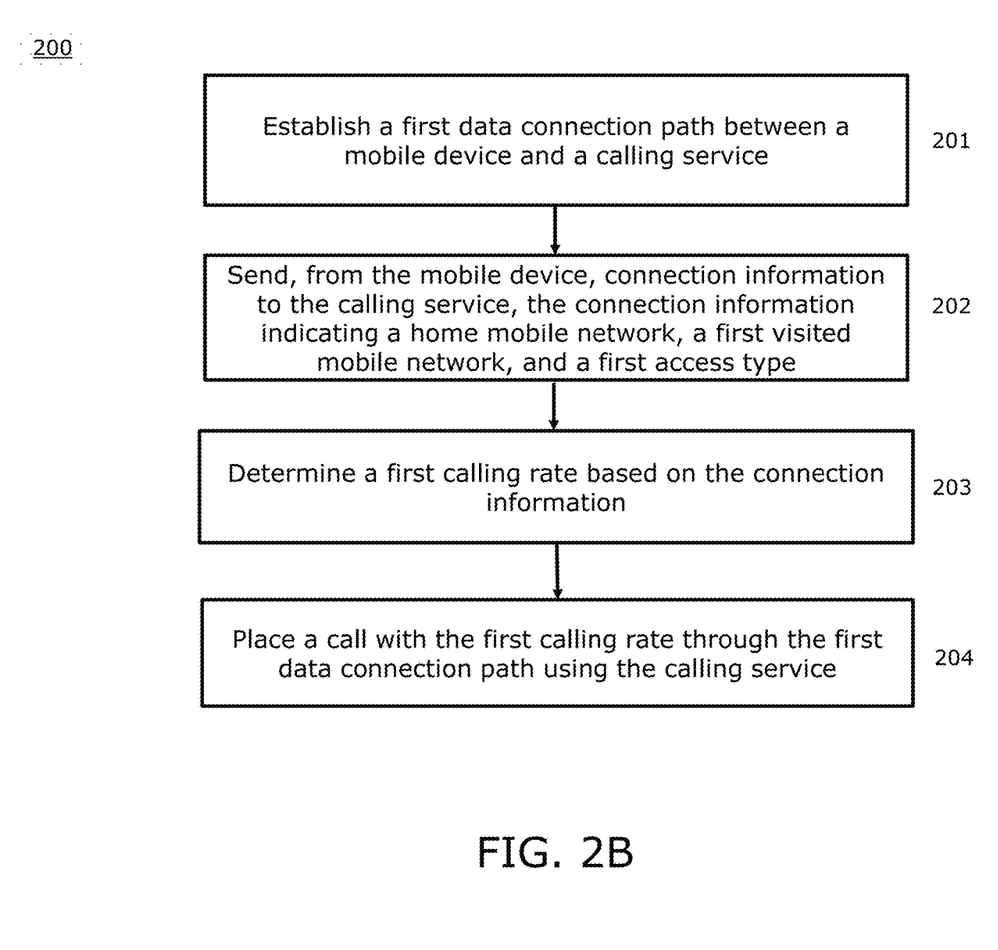
FIG. 2B is a flow chart illustrating an example method for placing an outgoing call with a mobile device using a data connection.

FIG. 2B is a flow chart illustrating an example method for placing an outgoing call with a mobile device using a data connection. According to some embodiments, a mobile device establishes 201 a first data connection between the mobile device and a calling service. In some embodiments, the mobile device sends 202 connection information to the calling service. The connection information may indicate a home mobile network, a first visited mobile network, and a first access type. In some embodiments, the mobile device or the calling service determines 203 a first calling rate based on the connection information. In some embodiments, the mobile device places 204 a call with the first calling rate through the first data connection path using the calling service.

Referring back to FIG. 2A, according to some embodiments, UE 101 may be further configured to detect a second data connection path 290 to the calling service. The second data connection path 290 may be an Internet connection not facilitated by the visited and home mobile networks (e.g., WiFi 262 or LAN connection). Also, the second data connection 290 may have a different access type than the first data connection 280. For instance, the second data connection 290 may be an Internet connection over WiFi 262, while the first data connection path 280 may be a LTE or 3G roaming connection through mobile networks.

In some embodiments, the UE 101 may be configured to search for one or more data connection paths, before or during a call, and determine (or cause the calling service 270 to determine) the calling rate for each data connection path based on the determination method 300 described above. The UE 101 may select the data connection path with the lowest determined calling rate to minimize the cost to the mobile subscriber. For instance, the UE 101 may detect the first data connection path 280 to the calling service 270 and determine a first calling rate for the first data connection path 280. In the event the UE 101 detects a second data connection path 290, the UE 101 may determine a second calling rate for second data connection path 290 and switch to the second data connection path 290 if the second calling rate is less than the first calling rate.

For a non-limiting example, if the mobile subscriber 208 places a call with the UE 101 through the first data connection 280, the mobile subscriber 208 will be charged the first calling rate for each minute during the call that the UE 101 is connected to the calling service through the first data connection 280. According to this example, the first calling rate is based partially on the pre-negotiated rate for the home mobile network operator and the visited mobile network operator combination as the call data is being transmitted through the mobile networks. If the UE 101 enters an area during the call where a second data connection path 290 to the calling service, for instance WiFi, is available, the UE 101 may be configured to automatically switch to the second data connection 290.

According to other embodiments, the UE 101 may switch data connection paths if the data connection path the UE 101 is using becomes unavailable. For instance, if the UE 101 leaves an area where WiFi is available, or moves to a different visited mobile network. The transfer (or hand off) between data connection paths is seamless and may be performed without interrupting the mobile subscriber's call.

In some embodiments, the UE 101 may disconnect from the first data connection path 280, connect to the second data connection path 290, and send updated connection information to the calling service 270. The updated connection information may indicate a second visited network or a second access type. The UE 101 may continue the placed call with a second calling rate through the second data connection path 290 using the calling service 270, wherein the second calling rate is based on the updated connection information.

According to some embodiments, the UE 101 may be configured to optimize the audio of the placed call by utilizing an audio codec to reduce data communicated between the UE 101 and the calling service 270. In some embodiments, the calling service may be configured to optimize the audio of the placed call by utilizing an audio codec to reduce data communicated between the UE 101 and the calling service 270.

An audio codec (coder/decoder) can be used to encode an audio signal into a digital stream for communication over a network and to decode the digital stream back to audio for presentation at the receiver. Different codecs, for example, can sample at different sampling rates, can use different encoding mechanisms, and can capture different frequency ranges. Many voice codecs are referred to as being either narrowband codecs, wideband codecs, super wideband or fullband codecs. Wideband codecs, fullband and super wideband codecs can be referred to collectively as high definition (HD) codecs.

According to some embodiments, the UE 101 or the calling service 270 may select and utilize audio codecs in order to establish the proper balance between audio sound quality and data usage. As described above, the calling rate charged to the mobile subscriber may be based at least partially on the data used or transmitted per minute. High quality audio (wideband codecs, or super wideband codecs) requires more data per minute than lower quality audio (narrowband codecs). In other words, the selection of audio/call quality will affect the calling rate of a call placed through the first data connection 280. However, if the call is placed through a data connection unaffiliated with mobile networks, such as the second data connection 290, the high quality audio will not affect the calling rate.

Thus, according to some embodiments, the UE 101 and/or the calling service 270 may select the audio quality or audio codec based on the access type of the data connection being utilized, and automatically change the audio codec if the access type of the data connection changes. In some embodiments, the UE 101 may offer the mobile subscriber 208 a choice of call quality (e.g., high, medium, low, etc.) before or during a call. The UE 101 may also display a different calling rate for each choice of call quality. For example, if the UE 101 is connected to the calling service 270 through the first data connection 280, the pre-negotiated data rate for the access type and visited and home network combination is $0.15 per minute. According to this example, the data usage required for high audio quality is 2 megabytes per minute, medium audio quality 1 megabyte per minute, and low audio quality is 0.5 megabytes per minute, the calling rate for each level of audio quality is $0.30 per minute, $0.15 per minute, and $0.075 per minute, respectively. This allows the mobile subscriber 208 to select level of quality desired based on the calling rate.

Figure 4:
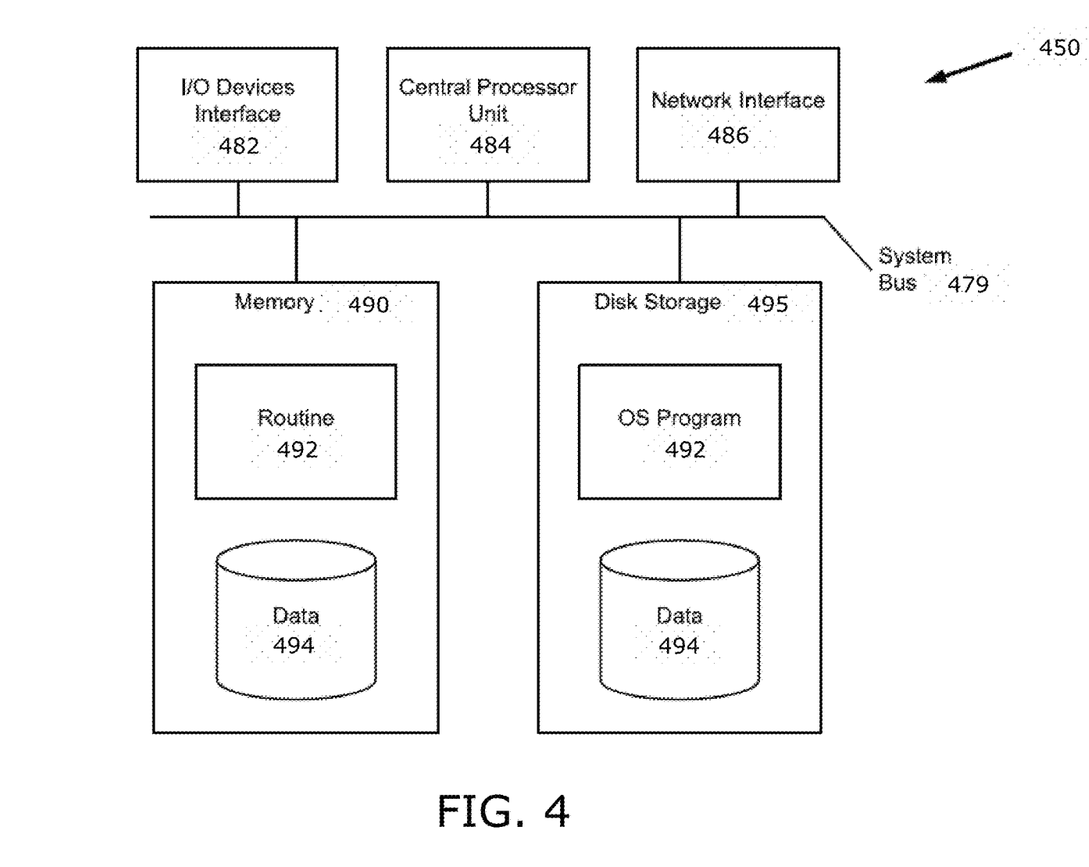
FIG. 4 is a block diagram of the internal structure of a computer in which various embodiments of the present disclosure may be implemented.

FIG. 4 is a block diagram of the internal structure of a computer 450 (e.g., a mobile device, UE, an implementation of the calling service etc.) in which various embodiments of the present invention may be implemented. The computer 450 contains a system bus 479, where a bus is a set of hardware lines used for data transfer among the components of a computer or processing system. Bus 479 is essentially a shared conduit that connects different elements of a computer system (e.g., processor, disk storage, memory, input/output ports, network ports, etc.) that enables the transfer of information between the elements. Attached to system bus 479 is I/O device interface 482 for connecting various input and output devices (e.g., keyboard, mouse, displays, printers, speakers, etc.) to the computer 450. Network interface 486 allows the computer 450 to connect to various other devices attached to a network. Memory 490 provides volatile storage for computer software instructions 492 (e.g., instructions for the process 200 of FIG. 2B for placing a call, and instructions for the process 300 of FIG. 3 for determining a calling rate) and data 494 used to implement an embodiment of the present invention (e.g., to store the connection information and predetermined information). Disk storage 495 provides non-volatile storage for computer software instructions 492 and data 494 used to implement an embodiment of the present invention. Central processor unit 484 is also attached to system bus 479 and provides for the execution of computer instructions.

In one embodiment, the processor routines 492 (e.g., instructions for the process 200 of FIG. 2B for placing a call, and instructions for the process 300 of FIG. 3 for determining a calling rate) and data 494 are a computer program product (generally referenced 492), including a computer readable medium (e.g., a removable storage medium such as one or more DVD-ROM's, CD-ROM's, diskettes, tapes, etc.) that provides at least a portion of the software instructions for the invention system. Computer program product 492 can be installed by any suitable software installation procedure, as is well known in the art.

In another embodiment, at least a portion of the software instructions may also be downloaded over a cable, communication and/or wireless connection.

Further, the present invention may be implemented in a variety of computer architectures. The computer of FIG. 4 is for purposes of illustration and not limitation of the present invention.

While example embodiments have been particularly shown and described, it will be understood by those skilled in the art that various changes in form and details may be made therein without departing from the scope encompassed by the appended claims.

It should be understood that the example embodiments described above may be implemented in many different ways. In some instances, the various methods and machines described herein may each be implemented by a physical, virtual or hybrid general purpose computer having a central processor, memory, disk or other mass storage, communication interface(s), input/output (I/O) device(s), and other peripherals. The general purpose computer is transformed into the machines that execute the methods described above, for example, by loading software instructions into a data processor, and then causing execution of the instructions to carry out the functions described, herein.

As is known in the art, such a computer may contain a system bus, where a bus is a set of hardware lines used for data transfer among the components of a computer or processing system. The bus or busses are essentially shared conduit(s) that connect different elements of the computer system, e.g., processor, disk storage, memory, input/output ports, network ports, etc., which enables the transfer of information between the elements. One or more central processor units are attached to the system bus and provide for the execution of computer instructions. Also attached to system bus are typically I/O device interfaces for connecting various input and output devices, e.g., keyboard, mouse, displays, printers, speakers, etc., to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

In certain embodiments, the procedures, devices, and processes described herein constitute a computer program product, including a non-transitory computer-readable medium, e.g., a removable storage medium such as one or more DVD-ROM's, CD-ROM's, diskettes, tapes, etc., that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A system comprising:
    a mobile device configured to:
        cause a first packetized data connection path to be established between the mobile device and a calling service, the first packetized data connection path including (i) a data roaming connection between a first visited mobile network and a home mobile network, and (ii) a data connection between the home mobile network and the calling service,
        send connection information to the calling service through the first packetized data connection path, the connection information indicating the home mobile network, the first visited mobile network, and a first access type, the calling service to place a call to a destination number with a first calling rate based on the sent connection information, and
        communicate data packets of call audio through the first packetized data connection path with the calling service.

2. The system of claim 1, wherein the home mobile network is configured to:
    recognize the mobile device is communicating with the calling service through the first packetized data connection path,
    record an amount of data communicated between the mobile device and the calling service, and
    charge the calling service for the amount of data communicated between the mobile device and the calling service.

3. The system of claim 2, wherein the home mobile network is further configured to zero-rate data communicated through the first data connection path.

4. The system of claim 1, wherein the mobile device is further configured to:
    detect and connect to a second packetized data connection path to the calling service,
    send updated connection information to the calling service, the updated connection information indicating a second visited network, or a second access type, and
    continue the placed call with a second calling rate by communicating data packets of call audio through the second packetized data connection path with the calling service,
    wherein the second calling rate is based on the updated connection information.

5. The system of claim 1, wherein the first calling rate is further based on an applied discount.

6. The system of claim 1, wherein the first calling rate is further based on the destination number.

7. The system of claim 1, wherein the data connection between the home mobile network and the calling service is a virtual private network connection.

8. The system of claim 1, wherein the data connection between the home mobile network and the calling service is a public internet connection.

9. The system of claim 1, wherein the mobile device is further configured to:
    optimize the placed call by utilizing an audio codec to reduce data communicated between the mobile device and the calling service.

10. The system of claim 1, wherein the calling service is configured to:
    optimize the placed call by utilizing an audio codec to reduce data communicated between the mobile device and the calling service.

11. The system of claim 1, wherein the communication information further includes a destination number.

12. The system of claim 11, wherein the communication information further includes an originating number.

13. The system of claim 1, wherein the first access type is a 5G connection, a Long-Term Evolution connection, a 3G connection, or a wireless local area network connection.

14. The system of claim 1, wherein the calling rate is determined by the calling service.

15. A system comprising:
    a calling service configured to:
        receive connection information from the mobile device, the connection information indicating a home mobile network, a first visited mobile network, and an first access type, the connection information being received through a first packetized data connection path between the mobile device and the calling service, the first packetized data connection path including (i) a data roaming connection between the first visited mobile network and the home mobile network, and (ii) an external data connection between the home mobile network and the calling service,
        determine a first call rate based on the connection information,
        place a call to a destination number for the mobile device subject to the determined first call rate, and
        communicate data packets of call audio to the mobile device through the first packetized data connection path.

16. The system of claim 15, wherein the mobile device is roaming on the visited mobile network.

17. The system of claim 15, wherein the calling service is charged for an amount of data communicated between the mobile device and the calling service over the first packetized data connection path.

18. The system of claim 15, wherein the calling service is further configured to:
    receive updated connection information from the mobile device, the updated connection information indicating a second visited network or a second access type,
    determine a second call rate based on the updated connection information,
    change the determined first call rate to the determined second call rate, and
    continue to communicate the placed call by communicating data packets of call audio through a second packetized data connection path to the mobile device.

19. The system of claim 15, wherein the calling service is configured to determine the first calling rate based on the connection information and the destination number.

20. The system of claim 15, wherein the calling service is further configured to apply a discount to the determined call rate.

21. The system of claim 15, wherein the data connection between the home mobile network and the calling service is a virtual private network connection.

22. The system of claim 15, wherein the data connection between the home mobile network and the calling service is a public internet connection.

23. The system of claim 15, wherein the calling service is configured to:
optimize the placed call by utilizing an audio codec to reduce data communicated between the mobile device and the calling service.

24. The system of claim 15, wherein the communication information further indicates a destination number.

25. The system of claim 24, wherein the communication information further indicates an originating number.

26. The system of claim 15, wherein the first access type is a 5G connection, a Long-Term Evolution connection, a 3G connection, or a wireless local area network connection.

27. A method comprising:
causing a first packetized data connection path to be established between a mobile device and a calling service, the first packetized data connection path including (i) a data roaming connection between a first visited mobile network and a home mobile network, and (ii) a data connection between the home mobile network and the calling service;
sending, from the mobile device, connection information to the calling service, the connection information indicating a home mobile network, a first visited mobile network, and a first access type;
determining a first calling rate based on the connection information; and
causing the calling service to place a call to a destination number with the first calling rate; and
communicating data packets of call audio through the first packetized data connection path with the calling service.

28. The method of claim 27, wherein the home mobile network is configured to:
recognize the mobile device is communicating with the calling service through the first packetized data connection path,
record an amount of data communicated between the mobile device and the calling service, and
charge the calling service for the amount of data communicated between the mobile device and the calling service.

29. The method of claim 28, further comprising zero-rating data communicated through the first data connection.

30. The method of claim 27, further comprising:
detecting and connecting the mobile device to a second packetized data connection path to the calling service;
sending, from the mobile device, updated connection information to the calling service, the updated connection information indicating a second visited network, or a second access type; and
continuing the placed call with a second calling rate by communicating data packets of call audio through the second data connection path to the calling service;
wherein the second calling rate is based on the updated connection information.

31. The method of claim 27, wherein the first calling rate is further based on applied discount.

32. The method of claim 27, wherein the first calling rate is further based on the destination number.

33. The method of claim 27, wherein the data connection between the home mobile network and the calling service is a virtual private network connection.

34. The method of claim 27, wherein the data connection between the home mobile network and the calling service a public internet connection.

35. The method of claim 27, further comprising optimizing the placed call by utilizing an audio codec to reduce data communicated between the mobile device and the calling service.

36. The method of claim 27, wherein the communication information further includes a destination number.

37. The method of claim 36, wherein the communication information further includes an originating number.

38. The method of claim 27, wherein the first access type is a 5G connection, a Long-Term Evolution connection, a 3G connection, or a wireless local area network connection.

39. The method of claim 27, wherein the calling rate is determined by the calling service.

* * * * *

UNITED STATES PATENT AND TRADEMARK OFFICE
CERTIFICATE OF CORRECTION

PATENT NO.         : 10,057,429 B2                                      Page 1 of 1
APPLICATION NO.    : 15/341200
DATED              : August 21, 2018
INVENTOR(S)        : Manpreet Singh It is certified that error appears in the above-identified patent and that said Letters Patent is hereby corrected as shown below:

In Column 16, Line 26, Claim 34, after "service", insert --is--

Signed and Sealed this
Sixteenth Day of October, 2018

Andrei Iancu
*Director of the United States Patent and Trademark Office*